US008629596B2

(12) United States Patent
Germishuizen et al.

(10) Patent No.: US 8,629,596 B2
(45) Date of Patent: Jan. 14, 2014

(54) END TURN ARRANGEMENT

(75) Inventors: Johannes Germishuizen, Ruhstorf a.d. Rott (DE); Arne Grüning, Passau (DE); Martin Junge, Grafenau (DE)

(73) Assignee: Siemens Aktiengesellschaft, München (DE)

( * ) Notice: Subject to any disclaimer, the term of this patent is extended or adjusted under 35 U.S.C. 154(b) by 241 days.

(21) Appl. No.: 13/147,002

(22) PCT Filed: May 17, 2010

(86) PCT No.: PCT/EP2010/056698
§ 371 (c)(1),
(2), (4) Date: Jul. 29, 2011

(87) PCT Pub. No.: WO2011/006693
PCT Pub. Date: Jan. 20, 2011

(65) Prior Publication Data
US 2011/0291423 A1 Dec. 1, 2011

(30) Foreign Application Priority Data

Jul. 13, 2009 (DE) .......................... 10 2009 032 883

(51) Int. Cl.
*H02K 3/12* (2006.01)
(52) U.S. Cl.
USPC .......................... 310/208; 310/198; 310/260
(58) Field of Classification Search
USPC ........................ 310/198, 195, 208, 270, 260; 29/596–598
See application file for complete search history.

(56) References Cited

U.S. PATENT DOCUMENTS

| 6,781,276 | B1 | 8/2004 | Stiesdal et al. | |
|---|---|---|---|---|
| 6,812,610 | B2* | 11/2004 | Kim et al. | 310/184 |
| 8,093,777 | B2* | 1/2012 | Stiesdal | 310/198 |
| 2004/0041491 | A1 | 3/2004 | Gorohata et al. | |
| 2005/0264123 | A1 | 12/2005 | Maeda et al. | |
| 2007/0284962 | A1* | 12/2007 | Fukasaku et al. | 310/180 |

FOREIGN PATENT DOCUMENTS

| DE | 195 29 970 C1 | 7/1996 |
|---|---|---|
| DE | 10 2007 042 338 A1 | 3/2009 |
| JP | 2009189078 A * | 8/2009 |

OTHER PUBLICATIONS

JP 2009189078 A machine translation May 12, 2013.*

(Continued)

*Primary Examiner* — Tran Nguyen
*Assistant Examiner* — Leda Pham
(74) *Attorney, Agent, or Firm* — Henry M Feiereisen LLC

(57) ABSTRACT

The invention relates to an end turn arrangement in a stator of a dynamoelectric machine. In order to reduce, in a simple fashion, the volume required for the end turns of the form-wound coils, the stator is formed of segments (1) that have a substantially circular arc-shaped cross-section and can be combined into a stator by adding one or more other segments (1) having the same design. Each segment (1) has recesses (6, 7), within which at least one first form-wound coil (3), which is bent outward in the radial direction of the stator in the region of the end turns, and at least one second form-wound coil (4), which is bent inward in the radial direction of the stator in the region of the end turns, are arranged in the form of a tiered winding.

13 Claims, 3 Drawing Sheets

(56) References Cited

OTHER PUBLICATIONS

Prof. Dr. F. Niethammer: "Elektromaschinenbau auf wissenschaftllcher Grundlage für den praktischen Gebrauch aufgebaut für Studenten und Ingenieure aus Hoch- und Fachschulen"; Heidelberg 1946, Carl Winter, Universitätsverlag; pp. 26-27; Book; 1946;.

Bala, C., Fetita, Al., Lefter, V.: Handbuch der Wickeltechnik elektrischer Maschinen Theoria, Konstruktion und Technologie von Wicklungen rotierender elektrischer Maschinen; vol. 2, Berlin, VEB Verlag Technik, 1976, pp. 125, 126 and 327; Book; 1976.

* cited by examiner

END TURN ARRANGEMENT

CROSS-REFERENCES TO RELATED APPLICATIONS

This application is the U.S. National Stage of International Application No. PCT/EP2010/056698, filed May 17, 2010, which designated the United States and has been published as International Publication No. WO 2011/006693 A2 and which claims the priority of German Patent Application, Serial No. 10 2009 032 883.1, filed Jul. 13, 2009, pursuant to 35 U.S.C. 119(a)-(d).

BACKGROUND OF THE INVENTION

The invention relates to an end turn arrangement of a stator of a dynamoelectric machine.

The invention is advantageously used wherever electrical machines are used as a generator or as a motor in the higher power range. Examples of this are gearless wind turbines and tidal power stations which require very large generators for converting mechanical energy into electrical energy.

Electrical machines in the higher power range are frequently designed with so-called form-wound coils such as are disclosed, for example, in DE 195 29 970 CI. These are pre-formed bundles of conductors which are wrapped with a generally strip-shaped insulating material. To produce a form-wound coil, a raw coil is usually wound first and subsequently spread so that it can be laid in slots of the stator. As the conductors of the individual form-wound coils overlap piecemeal in the region of the end turns, the end turns of some conductors are bent in such a way that they point outwards viewed in a radial direction after installation in the stator. In this way, it is possible to enable form-wound coils with bent end turns and form-wound coils with non-bent end turns to be overlapped. Such an arrangement for a single-layer form-wound coil winding can be seen in FIG. 1. As can be seen, form-wound coils which differ with regard to the bend of their end turns are laid alternately in the slots of the stator. Two of the form-wound coils used in each case have a bend in the region of the end turns which points outwards viewed in the radial direction. These two bent form-wound coils each overlap a non-bent form-wound coil.

SUMMARY OF THE INVENTION

The invention is based on the object of reducing the volume required by the end turns of the form-wound coils of an electrical machine in a structurally simple manner.

This object is achieved by a segment for a ring-shaped stator of a dynamoelectric machine which has a substantially circular arc-shaped cross section and which, by adding one or more further segments of the same design, can be supplemented to form the stator, wherein the segment has slots in which
  at least one first form-wound coil which is bent outwards in the radial direction of the stator in the region of the end turns, and
  at least one second form-wound coil which is bent inwards in the radial direction of the stator in the region of the end turns
are arranged in the form of a tiered winding.

Advantageous embodiments of the invention can be seen in the dependent patent claims.

The invention is based on the knowledge that some of the form-wound coils which are laid in the slots of the stator of the electrical machine can have an end turn which is bent inwards in a radial direction when the ring-shaped stator is designed in a segmented manner. A stator which is segmented in this way is built up of a plurality of circular arc-shaped elements. If these circular arc-shaped segments are fitted together, this results in the closed cylindrical stator of the dynamoelectric machine.

When the dynamoelectric machine is assembled, the segments according to the invention fitted with the form-wound coils can now be assembled around a rotor. Only the segmented design of the stator allows stator and rotor to be assembled to form the dynamoelectric machine in spite of the inwards-pointing end turns. This would not be possible in a conventional design in which the stator is designed as a complete hollow cylinder, as the inwards-pointing end turns would prevent the rotor from being slid into the stator.

In addition, the segmented design of the ring-shaped stator has the advantage that the dynamoelectric machine can very easily be transported to its later place of use dismantled into individual parts. This is of particular advantage with very large electrical machines. The individual stator segments take up significantly less volume and can therefore still be transported by road even with very large machines. In this way, generators of directly driven wind turbines, for example, which can have a diameter of more than 5 m, can be transported relatively easily to their place of use.

In an advantageous embodiment of the invention, the number of coil variations required can be reduced in that the first and second form-wound coil are of the same design and are laid in the slots in opposite directions. In this embodiment, both types of form-wound coil are initially made in an identical manner. The wound raw coils are subsequently spread so that they can be laid in the slots of the stator provided for the purpose. Finally, the end turns are bent at both ends. The first form-wound coil is then laid in the slots of the stator in such a way that its end turns point outwards viewed in the radial direction, that is to say face away from the axis of rotation of the stator.

Conversely, the second form-wound coil is laid in the slots of the stator in such a way that its end turns point inwards viewed in the radial direction, that is to say face towards the axis of rotation of the stator.

As a result of the different arrangement of the form-wound coils in the slots and of the associated end turns, the end turn projection can be shortened. However, it is not necessary to produce two different types of coil for this purpose. The first and the second form-wound coil can be of exactly the same design. They are simply laid in the slots in opposite directions so as to produce a different orientation of the end turns which results in the desired shortening of the end turn projection.

In an advantageous embodiment of the invention, the end turn projection can be further reduced in that the segment has at least one third non-bent form-wound coil which is arranged between the first and the second form-wound coil. This enables an even denser packaging of the conductors in the region of the end turns to be achieved. A form-wound coil, which has the shape of the third form-wound coil, is in each case located between the differently bent form-wound coils. Viewed over the circumference of the stator, the form-wound coils therefore alternate in such a way that the third form-wound coil follows the first form-wound coil and the second form-wound coil follows the third form-wound coil. In this way, the maximum reduction of the end turn projection can be achieved with only two different types of form-wound coil when, in an advantageous manner, the first form-wound coil has the same design as the second form-wound coil.

In an advantageous embodiment of the invention, laying the prefabricated form-wound coils in the slots of the stator is simplified in that a feed conductor of each form-wound coil is arranged in a first slot, the slot flanks of which are aligned parallel to the slot flanks of a second slot in which the associated return conductor is arranged. In a conventional design of the stator slots of a dynamoelectric machine, the slot flanks of the slots in which feed and return conductors are laid are skewed with respect to one another by an angle which depends on the number of slots in the stator. This makes laying the form-wound coils in the slots more difficult, as in this process the form-wound coils have to be spread apart a little further. In contrast, the laying of the form-wound coils is made considerably easier by the parallel arrangement of the slot flanks.

In an advantageous embodiment of the invention, a dynamoelectric machine with inner rotor can be realized in that the slots point inwards viewed in the radial direction of the stator.

Alternatively, in a further advantageous embodiment of the invention, a dynamoelectric machine with outer rotor can be achieved when the slots point outwards viewed in the radial direction of the stator.

BRIEF DESCRIPTION OF THE DRAWING

The invention is described and explained in more detail below with reference to exemplary embodiments shown in the figures. In the drawing.

DETAILED DESCRIPTION OF PREFERRED EMBODIMENTS

Figure 1:
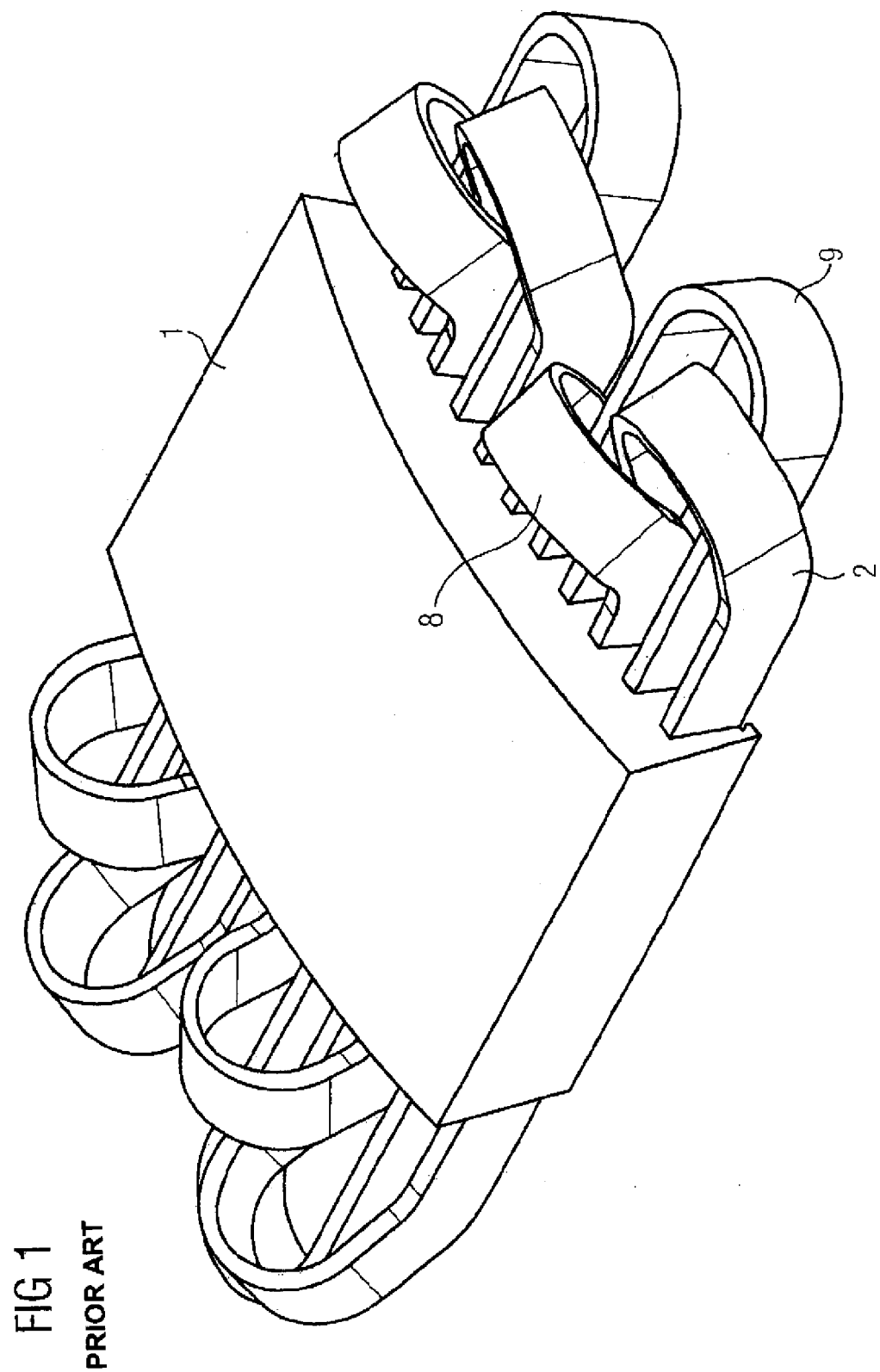
FIG. 1 shows a segment of a stator with an end turn arrangement of single-layer form-wound coils known from the prior art.

FIG. 1 shows a segment 1 of a stator having an end turn arrangement of single-layer form-wound coils which is known from the prior art. The segment 1 includes slots in which three different types of form-wound coils are laid. These form-wound coils differ from one another with regard to their bend in the region of the end turns. As the form-wound coils are arranged on top of one another due to the overlapping arrangement in the region of the end turns, this form of winding is also referred to as a tiered winding.

A first form-wound coil type 9 is designed without a bend. A second form-wound coil type 2 has a slight bend which points into the outer part of the machine viewed in the axial direction of the stator. As form-wound coils of the first form-wound coil type 9 overlap form-wound coils of the second form-wound coil type 2, the end turns of the second form-wound coil type 2 lie above those of the first form-wound coil type 9.

Furthermore, the segment 1 of the stator includes a third form-wound coil type 8. This has a more severe bend than the second form-wound coil type 2. The end turn of the third form-wound coil type 8 therefore lies even further above the second form-wound coil type 2. The third form-wound coil type 8 is bent in the same direction as the second form-wound coil type 2.

This form of tiered winding is known from electrical machines of conventional design. In this context, machines of conventional design are understood to mean an electrical machine with a usual stator which is made from completely circular electrical steel sheet and therefore does not have the segmentation described here. In this case, the end turns of the form-wound coils can only be bent outwards in order that the rotor of the electrical machine can be slid into the stator.

Figure 2:
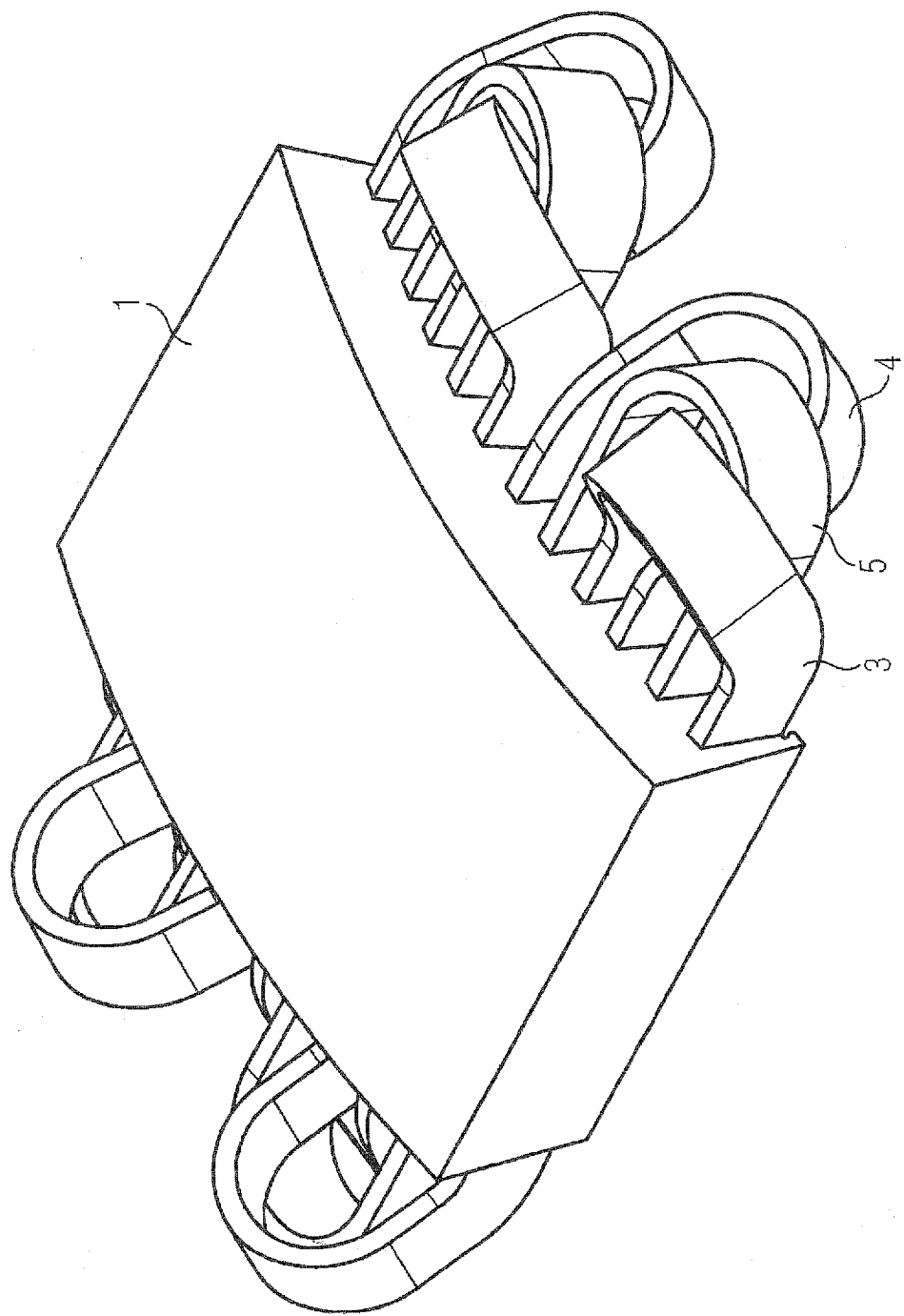
FIG. 2 shows the segment with an end turn arrangement of single-layer form-wound coils according to an embodiment of the invention.

FIG. 2 shows the segment 1 with an end turn arrangement of single-layer form-wound coils according to an embodiment of the invention. In contrast to the design of FIG. 1, here only two different types of form-wound coils are laid in the slots of the stator segment 1. A first form-wound coil 3 has a bend which points outwards viewed in the radial direction of the stator. The end turn of this first form-wound coil 3 corresponds to the end turn of a second form-wound coil 4, which in other respects is also of exactly the same design as the first form-wound coil 3. It is simply placed in the slots of the segment 1 in exactly the opposite direction. As a result of this reversed arrangement, the end turn of the second form-wound coil 4 points inwards viewed in the radial direction, i.e. towards the centre of the stator.

A third form-wound coil 5, which is designed without a bend, is located between the first form-wound coil 3 and the second form-wound coil 4. In the tiered winding shown here, this non-bent end turn is arranged between the outwardly bent end turn of the first form-wound coil 3 and the inwardly bent end turn of the second form-wound coil 4. In this way, the end turn projection of the segment 1 is significantly shortened compared with the end turn projection according to FIG. 1. Furthermore, the production of such a segment 1 is considerably easier. A tiered winding of this kind requires only two different types of form-wound coils, a bent version and a non-bent version. It is not necessary to produce two different bends as in the design according to FIG. 1. This reduces the manufacturing costs considerably.

Figure 3:
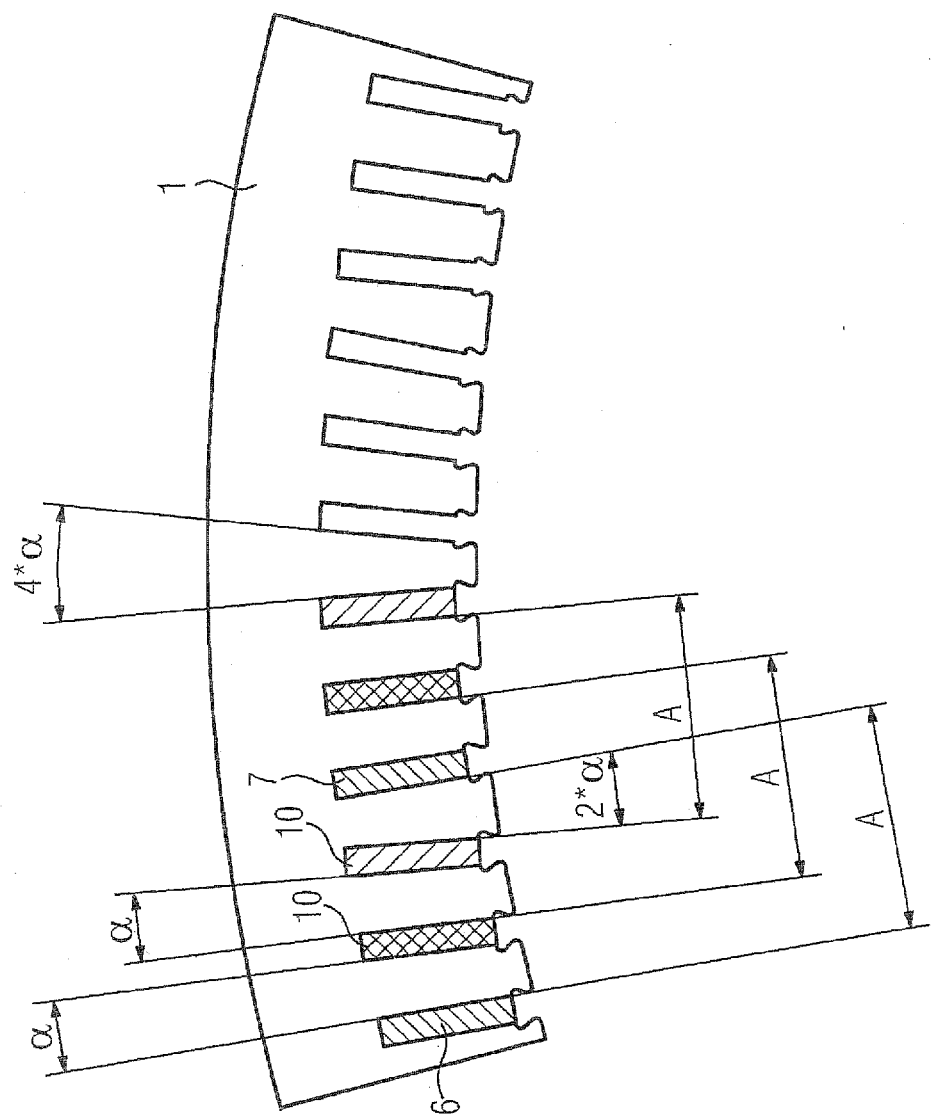
FIG. 3 shows an embodiment of the slots of a segment of a stator with parallel-flanked slots.

FIG. 3 shows an embodiment of the slots of a segment 1 of a stator with parallel-flanked slots. This parallel-flanked arrangement will be described below with reference to a first slot 6 and a second slot 7.

The first slot 6 is separated from the second slot 7 by two further slots 10. Examination of the flanks of the first and second slot 6, 7, shows that these are exactly parallel-flanked. The feed conductor of the first form-wound coil 3 is laid in the first slot 6. The return conductor of the first form-wound coil 3 is laid in the second slot 7. The two further slots 10 are occupied by the second form-wound coil 4 and the third form-wound coil 5.

There are also parallel-flanked slots to the further slots 10 so that here too form-wound coils which have parallel flanks can be inserted in each case.

This embodiment of the slots 6, 7, 10 considerably simplifies the insertion of the form-wound coils. Before insertion, the form-wound coils must be spread to the suitable slot spacing. They can then very easily be placed in the slots provided without further mechanical deformation of the form-wound coils taking place when doing so. This would not be possible with a conventional embodiment of the slots 6, 7, 10. In fact, with an inner rotor machine, the form-wound coil would be spread even further when laid in the slots, as the distance of the slots from one another viewed in the radial direction increases towards the outside.

The invention claimed is:

1. A segment for a ring-shaped stator of a dynamoelectric machine, said segment having a substantially circular arc-shaped cross section and constructed for attachment to other said segments to form a stator, said segment having slots and comprising:

at least one first form-wound coil arranged in the slots and bent outwards in a radial direction of the stator in a region of end turns; and at least one second form-wound coil arranged in the slots and bent inwards in the radial direction of the stator in the region of the end turns, wherein the first and second form-wound coils are arranged in the form of a tiered winding, and wherein the first and second form-wound coils are same design and laid in the slots in opposite directions.

2. The segment of claim 1, further comprising at least one third non-bent form-wound coil which is arranged between the first and the second form-wound coils.

3. The segment of claim 1, wherein each of the first and second form coils has a feed conductor and a return conductor, said feed conductor being arranged in a first one of the slots having slot flanks which are aligned parallel to slot flanks of a second one of the slots in which the return conductor is arranged.

4. The segment of claim 1, wherein the slots point inwards as viewed in the radial direction of the stator.

5. The segment of claim 1, wherein the slots point outwards as viewed in the radial direction of the stator.

6. A ring-shaped stator, comprising at least two segments, each said segment having a substantially circular arc-shaped cross section and having slots for arrangement of at least one first form-wound coil which is bent outwards in a radial direction of the stator in a region of end turns, and at least one second form-wound coil which is bent inwards in the radial direction of the stator in the region of the end turns, wherein the first and second form-wound coils are arranged in the form of a tiered winding, and wherein the first and second form-wound coils are same design and laid in the slots in opposite directions.

7. The stator of claim 6, wherein the segment includes at least one third non-bent form-wound coil which is arranged between the first and the second form-wound coils.

8. The stator of claim 6, wherein each of the first and second form coils has a feed conductor and a return conductor, said feed conductor being arranged in a first one of the slots having slot flanks which are aligned parallel to slot flanks of a second one of the slots in which the return conductor is arranged.

9. The stator of claim 6, wherein the slots point inwards as viewed in the radial direction of the stator.

10. The stator of claim 6, wherein the slots point outwards as viewed in the radial direction of the stator.

11. An electrical machine, comprising a ring-shaped stator which includes at least two segments, each said segment having a substantially circular arc-shaped cross section and having slots for arrangement of at least one first form-wound coil which is bent outwards in a radial direction of the stator in a region of end turns, and at least one second form-wound coil which is bent inwards in the radial direction of the stator in the region of the end turns, wherein the first and second form-wound coils are arranged in the form of a tiered winding, and wherein the first and second form-wound coils are of same design and laid in the slots in opposite directions.

12. The electric machine of claim 11, constructed in the form of a wind power generator.

13. A wind turbine, comprising an electrical machine which includes a ring-shaped stator having at least two segments, each said segment having a substantially circular arc-shaped cross section and having slots for arrangement of at least one first form-wound coil which is bent outwards in a radial direction of the stator in a region of end turns, and at least one second form-wound coil which is bent inwards in the radial direction of the stator in the region of the end turns, wherein the first and second form-wound coils are arranged in the form of a tiered winding, and wherein the first and second form-wound coils are same design and laid in the slots in opposite directions.

* * * * *